United States Patent
Woerner et al.

(10) Patent No.: US 10,562,510 B2
(45) Date of Patent: Feb. 18, 2020

(54) METHOD AND DEVICE FOR OPERATING A BRAKE SYSTEM FOR A VEHICLE AND BRAKE SYSTEM

(71) Applicant: KNORR-BREMSE SYSTEME FUER NUTZFAHRZEUGE GMBH, Munich (DE)

(72) Inventors: Dieter Woerner, Eppingen (DE); Michael Herges, Munich (DE); Friedbert Roether, Cleebronn (DE); Frank Schwab, Kieselbronn (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 190 days.

(21) Appl. No.: 15/739,402

(22) PCT Filed: Jun. 27, 2016

(86) PCT No.: PCT/EP2016/064792
§ 371 (c)(1),
(2) Date: Dec. 22, 2017

(87) PCT Pub. No.: WO2017/001315
PCT Pub. Date: Jan. 5, 2017

(65) Prior Publication Data
US 2019/0248355 A1   Aug. 15, 2019

(30) Foreign Application Priority Data

Jun. 29, 2015 (DE) .................. 10 2015 110 386

(51) Int. Cl.
*B60T 13/66* (2006.01)
*B60T 17/22* (2006.01)
(Continued)

(52) U.S. Cl.
CPC .............. *B60T 17/221* (2013.01); *B60T 8/17* (2013.01); *B60T 8/885* (2013.01); *B60T 13/58* (2013.01);
(Continued)

(58) Field of Classification Search
CPC .......... B60T 8/885; B60T 13/26; B60T 13/66; B60T 13/68; B60T 13/663; B60T 13/683
(Continued)

(56) References Cited

U.S. PATENT DOCUMENTS

| | | | |
|---|---|---|---|
| 5,717,134 A | 2/1998 | Schlichenmaier et al. | |
| 6,984,001 B2 * | 1/2006 | Nilsson ................... | B60T 8/885 303/122 |

(Continued)

FOREIGN PATENT DOCUMENTS

| | | |
|---|---|---|
| CN | 1148833 A | 4/1997 |
| CN | 1319059 A | 10/2001 |

(Continued)

OTHER PUBLICATIONS

International Search Report dated Nov. 10, 2016, of the corresponding International Application PCT/EP2016/064792 filed Jun. 27, 2016.

*Primary Examiner* — Christopher P Schwartz
(74) *Attorney, Agent, or Firm* — Norton Rose Fulbright US LLP; Gerard Messina (57) ABSTRACT

A method for operating a vehicle brake system, including: classifying a fault signal, indicating a fault of an electronic actuating device of the brake system, the actuating device outputting a brake pressure for a brake of the vehicle in a normal operating mode and a pneumatic actuating device for outputting the brake pressure in a backup operating mode, as a fault signal of a first fault category if the fault is a fault in which a switchover from the electronic actuating device (Continued)

afflicted with the fault to the pneumatic actuating device leads to an improvement in the outputting of the brake pressure; and switching from the electronic actuating device to the pneumatic actuating device, to output the brake pressure using the pneumatic actuating device, if the fault signal is a fault signal of the first fault category. A related computer readable medium, apparatus and brake system are also described.

11 Claims, 4 Drawing Sheets

(51) Int. Cl.
    *B60T 8/88*     (2006.01)
    *B60T 8/17*     (2006.01)
    *B60T 13/58*     (2006.01)

(52) U.S. Cl.
    CPC ... *B60T 2270/402* (2013.01); *B60T 2270/406* (2013.01)

(58) Field of Classification Search
    USPC .... 303/3, 7, 15, 20, 122.04–122.09; 701/29, 701/31, 33, 36, 41, 70–72, 80
    See application file for complete search history.

(56) References Cited

U.S. PATENT DOCUMENTS

| | | | |
|---|---|---|---|
| 7,396,088 B2* | 7/2008 | Nilsson | B60T 8/885 303/122.04 |
| 2005/0067888 A1 | 3/2005 | Nilsson | |
| 2005/0200194 A1* | 9/2005 | Nilsson | B60T 8/885 303/20 |

FOREIGN PATENT DOCUMENTS

| | | |
|---|---|---|
| DE | 60012444 T2 | 9/2005 |
| DE | 102009059811 B3 | 9/2011 |
| WO | 20060100536 A1 | 9/2006 |
| WO | 2010001031 A2 | 1/2010 |
| WO | 2013093545 A1 | 6/2013 |

* cited by examiner

METHOD AND DEVICE FOR OPERATING A BRAKE SYSTEM FOR A VEHICLE AND BRAKE SYSTEM

FIELD OF THE INVENTION

The present invention relates to a method and an apparatus for operating a brake system for a vehicle, and to a brake system.

BACKGROUND INFORMATION

In response to a braking demand from a driver of a vehicle, a brake pressure for a brake of the vehicle is output using a brake system. For this purpose, the brake system comprises an electronically controlled actuator. A pneumatic backup path is provided as a backup for the electronically controlled actuator.

SUMMARY OF THE INVENTION

It is an object of the invention to provide an improved method and an improved apparatus for operating a brake system for a vehicle, and an improved brake system.

Said object may be achieved by a method and an apparatus for operating a brake system for a vehicle, and by a brake system, as per the main claims.

The present approach is based on the realization that, in the event of a fault being identified in the provision of the brake pressure in the actuator, for example in the form of a pressure regulating module, it is not imperatively necessary for the actuator to be permanently electrically deenergized or switched into an electrically passive state and for the brake pressure to be output by the pneumatic backup path. By the pneumatic backup path, it can be assumed that the system characteristic in the backup state ensures a minimum degree of safety. The switchover of the actuator to the electrically deenergized state, and thus the provision of the brake pressure by the pneumatic backup, is however not always the optimum strategy depending on the fault type, because here, the safety level of the electronic regulator, which is possibly higher despite the fault state, remains unutilized. Depending on the type of fault, it may be the case that an improved system characteristic can be achieved by the electric provision of the brake pressure. This applies in particular to fault states which may also relate to the pneumatic backup path. By virtue of the fact that a switchover is not imperatively made to the pneumatic backup path in the event of a fault being identified, an improvement in the system characteristic can be achieved in the event of faults in the pressure actuator for vehicle brake systems.

A method for operating a brake system for a vehicle, wherein the brake system has an electronic actuating device for outputting a brake pressure for a brake of the vehicle in a normal operating mode and a pneumatic actuating device for outputting the brake pressure in a backup operating mode, comprises the following steps:

classifying a fault signal, which indicates a fault of the electronic actuating device, as a fault signal of a first fault category if the fault is a fault in the case of which a switchover from the electronic actuating device afflicted with the fault to the pneumatic actuating device leads to an improvement in the outputting of the brake pressure; and switching from the electronic actuating device to the pneumatic actuating device, in order to output the brake pressure using the pneumatic actuating device, if the fault signal is a fault signal of the first fault category.

The vehicle may be a road-going vehicle, in particular a utility vehicle. The brake pressure may be used for activating the brake, for example a service brake, of the vehicle. The brake pressure may be output in response to a braking demand from the driver or from an assistance system of the vehicle. The electronic actuating device may be configured to output the brake pressure in a manner controlled by an electric control signal. The pneumatic actuating device may be configured to output the brake pressure in a manner controlled by a pneumatic control pressure. The electronic actuating device and the pneumatic actuating device may be realized using separate or at least partly jointly used elements. For example, a relay valve may be provided which can be used by the electronic actuating device during the operation of the electronic actuating device and by the pneumatic actuating device during the operation of the pneumatic actuating device, and which can thus be regarded both as a constituent part of the electronic actuating device and as a constituent part of the pneumatic actuating device. The method permits a switchover from the normal operating mode to the backup mode if an improvement in the system characteristic can be expected as a result.

For example, the fault signal may be classified as a fault signal of the first fault category if the fault can be attributed to an electrical cause in the electronic actuating device. Also, the fault signal may be classified as a fault signal of the first fault category if the fault indicates an electrical short circuit in an electrical line assigned to the electronic actuating device. Thus, so-called "class 1" faults may be not only short-circuits but any type of faults in the electrical regulator which are uniquely identifiable. Aside from short-circuits, this also applies for example to an electrical line break, a defective output stage, a sensor in the error band, a defective electronic component, memory faults, such as RAM/ROM/EEPROM faults, crashed software etc. In the event of such faults, it can normally be assumed that the system characteristic can be improved through the use of the pneumatic backup path.

In the step of classifying, the fault signal can be classified as a fault signal of the second fault category if the fault is a fault in the case of which a switchover from the electronic actuating device afflicted with the fault to the pneumatic actuating device leads to no improvement in the outputting of the brake pressure. For this situation, the method may comprise a step of maintaining the use of the electronic actuating device, in order to continue to output the brake pressure using the electronic actuating device, if the fault signal is a fault signal of the second fault category. Thus, a switchover from the normal operating mode to the backup operating mode can be avoided if no improvement, or even a worsening, of the system characteristic can be expected as a result.

Correspondingly, in the step of classifying, the fault signal is classified as a fault signal of a third fault category if the fault is a fault in the case of which it is uncertain whether a switchover from the electronic actuating device afflicted with the fault to the pneumatic actuating device leads to an improvement in the outputting of the brake pressure. For this situation, the method may comprise a step of at least temporarily switching over from the electronic actuating device to the pneumatic actuating device, in order to at least temporarily output the brake pressure using the pneumatic actuating device, if the fault signal is a fault signal of the third fault category. This permits a test switchover from the normal operating mode to the backup mode. In this way, it is possible to test whether such a switchover leads to an improvement in the system characteristic. If this is the case, the switchover can be maintained. Otherwise, a switch can be made back to the normal operating mode.

For example, in the step of classifying, the fault signal may be classified as a fault signal of the third fault category if the fault is a fault which is based on an implausible pressure profile in a pneumatic line assigned to the electronic actuating device. In such a situation, it often cannot be reliably predicted whether the switchover to the pneumatic backup path leads to an improvement in the system characteristic.

The method may comprise a step of identifying whether the switchover from the electronic actuating device afflicted with the fault to the pneumatic actuating device leads to an improvement in the outputting of the brake pressure or whether the at least temporary switchover from the electronic actuating device afflicted with the fault to the pneumatic actuating device leads to no improvement in the outputting of the brake pressure. Furthermore, the method may comprise a step of switching back from the pneumatic actuating device to the electronic actuating device, in order to output the brake pressure using the electronic actuating device, if, in the step of identifying, it has been identified that the at least temporary switchover from the electronic actuating device afflicted with the fault to the pneumatic actuating device leads to no improvement in the outputting of the brake pressure. In this way, after a test switchover to the backup operating mode, it is possible to return to the normal operating mode if it has been found that the backup operating mode constitutes no improvement, or even a worsening, in relation to the normal operating mode.

For example, in the step of identifying, a first system characteristic during the outputting of the brake pressure using the electronic actuating device is compared with a second system characteristic during the outputting of the brake pressure using the pneumatic actuating device. By a comparison of the two system characteristics, it can be identified which of the two operating modes, that is to say the normal operating mode or the backup operating mode, leads to the better system characteristic.

The system characteristic may for example be defined by a pressure within a pneumatic line assigned to the brake, by a deceleration of the vehicle and additionally alternatively by a slip of a wheel assigned to the brake. In one embodiment, not only the slip of the affected wheel but also the differential slip between the affected wheel and another wheel of the vehicle are used as evaluation criteria, because the differential slip is particularly easy to measure and informative. Furthermore, the system characteristic may be defined by the source of the actuation signal. The source of the actuation signal may be understood to mean the driver or an assistance system. Here, no backup pressure is available for an assistance system.

The method may comprise a step of switching back from the pneumatic actuating device to the electronic actuating device in order to output the brake pressure using the electronic actuating device. The method may also comprise a step of identifying whether the switching back from the pneumatic actuating device to the electronic actuating device leads to an improvement in the outputting of the brake pressure. In this way, it is possible to check, for example at regular intervals or in response to a particular event, whether a better system characteristic can still be achieved by the backup operating mode than by a return to the normal operating mode. In the decision regarding the operating mode, it is also possible to take into consideration whether the demand originates from the driver or from an assistance system. In the case of a demand from the assistance system, it is possible for no pressure to be output by the pneumatic backup.

Also advantageous is a computer program product or computer program having program code which can be stored on a machine-readable carrier or storage medium such as a semiconductor memory, a hard drive memory or an optical memory. If the program product or program is executed on a computer or on an apparatus, the program product or program can be used for carrying out, implementing and/or actuating the steps of the method according to one of the embodiments described above.

The approach proposed here furthermore provides an apparatus for operating the brake system, which apparatus is configured to carry out, actuate or implement the steps of a variant of a method proposed here in corresponding devices. The object on which the invention is based can be quickly and efficiently achieved by this design variant of the invention, in the form of an apparatus, too.

The apparatus may be configured to read in input signals and to determine output signals using the input signals and to make said output signals available. An input signal may for example constitute a sensor signal that can be read in via an input interface of the apparatus. An output signal may constitute a control signal or a data signal that can be made available at an output interface of the apparatus. The apparatus may be configured to determine the output signals using a processing rule implemented in hardware or software form. For example, the apparatus may for this purpose comprise a logic circuit, an integrated circuit or a software module, and may be realized for example as a discrete structural element or may be comprised by a discrete structural element.

A brake system for a vehicle has the following features:

an electronic actuating device for outputting a brake pressure for a brake of the vehicle in a normal operating mode;

a pneumatic actuating device for outputting the brake pressure in a backup mode; and an abovementioned apparatus for operating the brake system.

The apparatus may be coupled via suitable interfaces to the actuating devices in order to be able to effect a switchover between the actuating devices.

Exemplary embodiments of the present invention will be discussed in more detail below with reference to the appended drawings.

DETAILED DESCRIPTION

In the following description of the exemplary embodiments of the present invention, identical or similar reference designations are used for the elements of similar action illustrated in the various drawings, wherein a repeated description of said elements is omitted.

Figure 1:
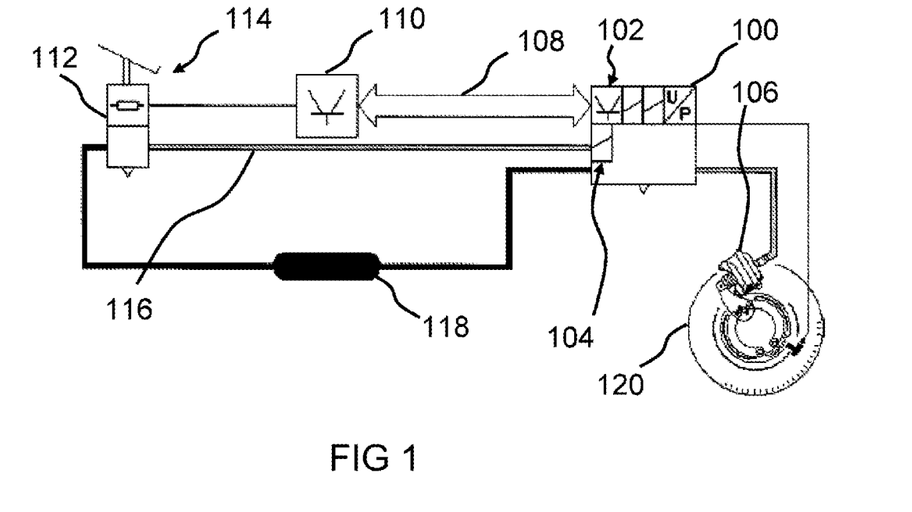
FIG. 1 shows an illustration of a brake system for a vehicle as per an exemplary embodiment.

FIG. 1 is an illustration of a brake system for a vehicle as per an exemplary embodiment. The brake system comprises an electropneumatic modulator (EPM) 100 with an electronic actuating device 102 and with a pneumatic actuating device 104 for outputting a brake pressure for a brake 106 of the vehicle. The brake system may be a known brake system such as is used for example in the utility vehicle sector.

The electronic actuating device 102 is configured to regulate the brake pressure in accordance with a setpoint value, which the electronic actuating device 102 receives, in this exemplary embodiment, via a brake CAN bus 108 from a control unit 110 of an electronic brake system (EBS_ECU). The control unit 110 is connected via a line to a setpoint value sensor 112 of a footbrake module 114 of the vehicle. In this way, a braking demand made by the driver of the vehicle using the footbrake module can be detected by the setpoint value sensor 112 and transmitted via the control unit 110 to the electronic actuating device 102. The electronic actuating device 102 is configured to output a brake pressure, corresponding to the braking demand, for the brake 106.

The footbrake module 114 is connected via a pneumatic backup line 116 to the pneumatic actuating device 104. In the event of a fault, a switchover is performed from a normal operating mode, in which the brake pressure is provided using the electronic actuating device 102, to a backup operating mode, in which a pneumatic setpoint value is transmitted directly from the footbrake module 114 to the electropneumatic modulator 100. In this case, the brake pressure, corresponding to the braking demand, for the brake 106 is output using the pneumatic actuating device 104. The function of the pneumatic actuating device 104 is, in one exemplary embodiment, similar to a relay valve.

Also shown in FIG. 1 is a reservoir 118 for providing an operating pressure required for the operation of the brake 106, and a wheel 120, which is to be braked by the brake 106, of the vehicle.

Figure 2:
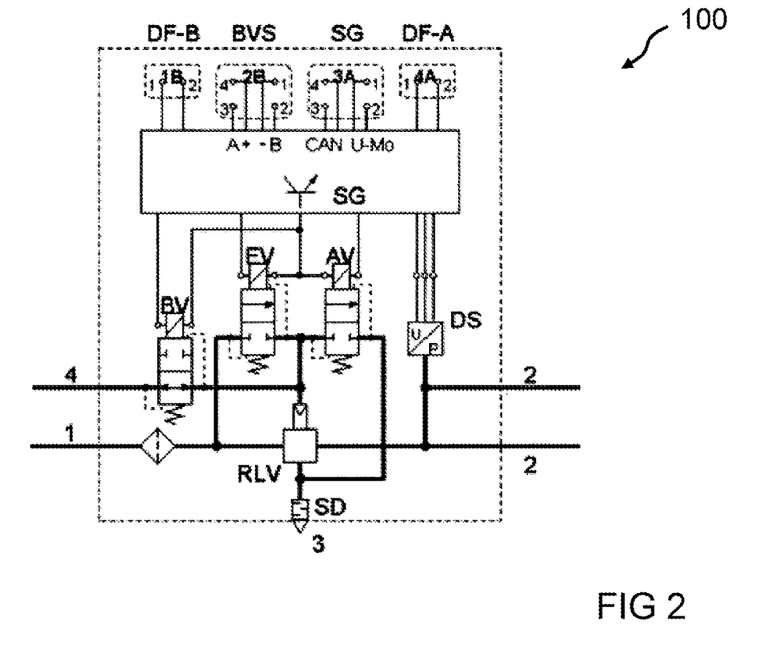
FIG. 2 shows an illustration of a pressure control module for a vehicle as per an exemplary embodiment.

In one exemplary embodiment, the electropneumatic modulator 100 has a relay valve, as shown on the basis of FIG. 2. The relay valve may be regarded as being both part of the pneumatic actuating device 104 and part of the electric actuating device 102. Thus, the electropneumatic modulator 100 can be configured without a physically distinguishable dedicated pneumatic actuating device. Whether the pressure is electrically or pneumatically regulated is, in one exemplary embodiment, determined only by the position of a backup valve (BV), as is shown in FIG. 2. If the backup valve is electrically energized, then the pressure in the control chamber of the relay part is electrically regulated. By contrast, if the backup valve is electrically deenergized, then the control chamber of the relay part is connected to the pressure from the footbrake module 114.

FIG. 2 is an illustration of a pressure control module 100 for a vehicle as per an exemplary embodiment. The pressure control module 100 may be the electropneumatic modulator shown in FIG. 1. For the backup operating mode, the pressure control module 100 has a port "4" to the retaining circuit. Furthermore, the pressure control module 100 has a port "1" to the reservoir, and two ports "2" to brake cylinders. Furthermore, the pressure control module 100 has a module "SG" for electrical connections. In this exemplary embodiment, the pressure control module 100 has a backup solenoid valve "BV", an inlet solenoid valve "EV", an outlet solenoid valve "AV", a pressure sensor "DS", a relay valve "RLV" and a silencer "SD".

In the normal operating mode, the brake pressure is output by the relay valve "RLV", which in turn is actuated using the electronically controlled inlet solenoid valve and the electronically controlled outlet solenoid valve. The inlet solenoid valve and the outlet solenoid valve can thus be assigned to the electronic actuating device. In the backup operating mode, the brake pressure is likewise output by the relay valve "RLV", which is however now pneumatically actuated via the port "4" and the backup solenoid valve "BV" switched into a pass-through position. The port "4" and the pneumatically actuated relay valve can be assigned to the pneumatic actuating device. A switchover between the normal operating mode and the backup operating mode can be performed using the backup solenoid valve. The position of the backup solenoid valve shown in FIG. 2 effects the backup operating mode.

Figure 3:
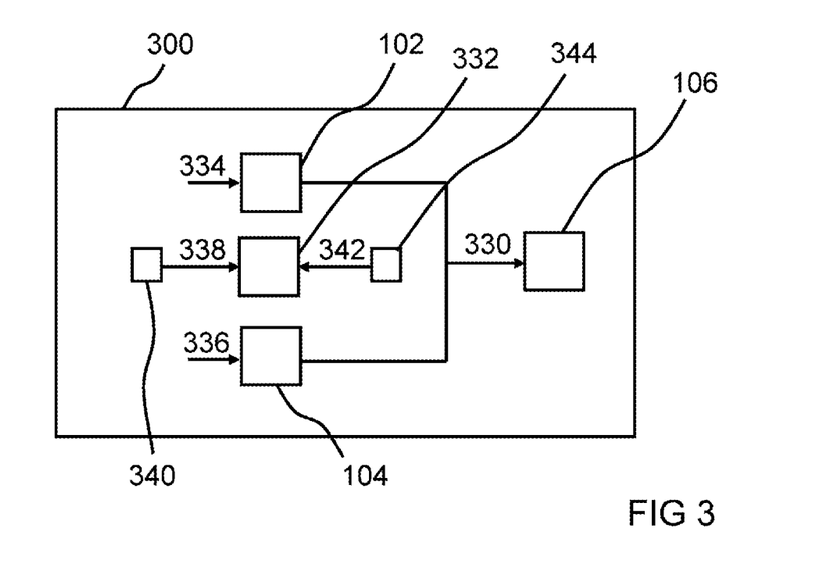
FIG. 3 shows a schematic illustration of a vehicle having a brake system as per an exemplary embodiment.

FIG. 3 is a schematic illustration of a vehicle 300 having a brake system as per an exemplary embodiment. The brake system may be based on the brake system described with reference to FIG. 1.

The brake system has an electronic actuating device 102 for outputting a brake pressure 330 for a brake 106 of the vehicle 300 in a normal operating mode and a pneumatic actuating device 104 for outputting the brake pressure 330 in a backup mode, and an apparatus 332 for operating the brake system.

The electronic actuating device 102 is configured to output the brake pressure using an electric control signal 334, which the electronic actuating device 102 can receive for example via a CAN bus. The pneumatic actuating device 104 is configured to output the brake pressure using a pneumatic control signal 336, which the pneumatic actuating device 104 can receive for example via a pneumatic backup line.

The apparatus 332 is configured to receive a fault signal 338 from a fault monitoring device 340. The fault monitoring device 340 is configured to identify a fault of the electronic actuating device 102 or a fault which influences a function of the electronic actuating device 102, and to make the fault signal 338, which indicates the fault, available to the apparatus 332. The apparatus 332 is configured to evaluate the fault signal 338 in order to decide, on the basis of the fault signal 338, whether the brake pressure 330 continues to be output using the electronic actuating device 102 or whether a switchover is performed to the pneumatic actuating device 104, in order to output the brake pressure 330 using the pneumatic actuating device 104. For example, the apparatus 332 may be configured to deactivate the electronic actuating device 102 in order to switchover to the pneumatic actuating device 104.

In one exemplary embodiment, the apparatus 332 is configured to receive a state signal 342 from a device 344 for monitoring a system characteristic of the brake system. The device 344 is configured to monitor the system characteristic and to make the state signal 342, which indicates the system characteristic, available to the apparatus 332. The apparatus 332 is configured to identify, using the state signal 342, whether the brake system has the better system characteristic using the electronic actuating device 102 or the pneumatic actuating device 104.

Figure 4:
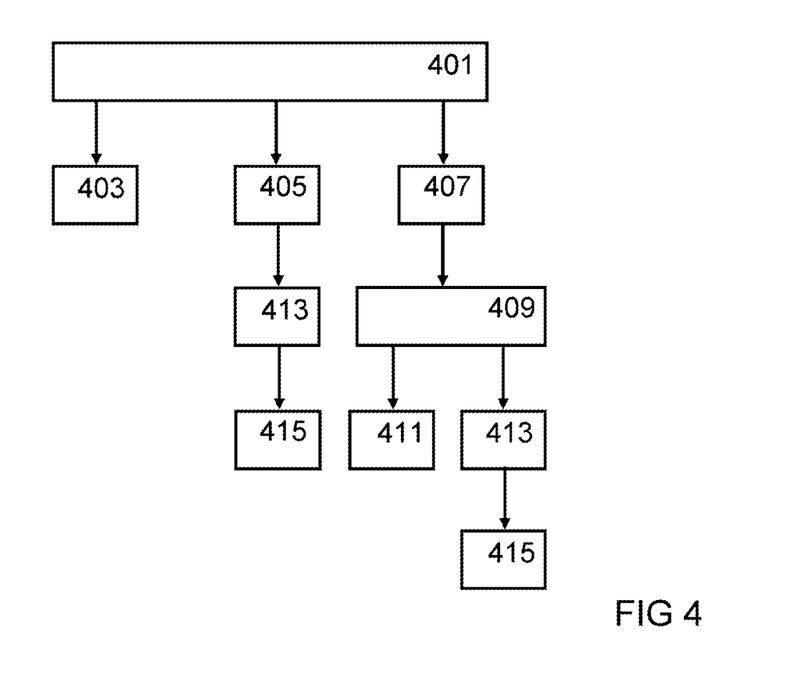
FIG. 4 shows a flow diagram of a method for operating a brake system for a vehicle as per an exemplary embodiment.

FIG. 4 shows a flow diagram of a method for operating a brake system for a vehicle as per an exemplary embodiment. The steps of the method may be carried out using the apparatus for operating a brake system as shown in FIG. 3.

The method comprises a step 401, in which a fault signal, for example the fault signal described with reference to FIG. 3, is classified. The fault signal may have been generated at a point in time in which the electronic actuating device of the brake system was used or was intended for use. If the fault signal is assigned to a first fault category, in the case of which it is assumed that a switchover from the electronic actuating device to the pneumatic actuating device leads to an improvement in the system characteristic of the brake system, then in a step 403, a switchover is performed from the electronic actuating device to the pneumatic actuating device. This may for example be the case if the fault signal is indicative of a short circuit.

By contrast, if, in the step 401 of classifying, the fault signal is assigned to a second fault category, in the case of which it is assumed that a switchover from the electronic actuating device to the pneumatic actuating device leads to no improvement, or even to a worsening, of the system characteristic of the brake system, then in a step 405, the use of the electronic actuating device is maintained.

If, in the step 401 of classifying, the fault signal is assigned to a third fault category, in the case of which it cannot be reliably predicted whether a switchover from the electronic actuating device to the pneumatic actuating device leads to an improvement in the system characteristic, then in a step 407, an at least temporary switchover from the electronic actuating device to the pneumatic actuating device is performed. This may be the case for example if the fault signal is indicative of an implausible pressure profile in the pneumatic system.

After the at least temporary switchover to the pneumatic actuating device, in a step 409, it is identified whether the switchover from the electronic actuating device to the pneumatic actuating device has led to an improvement in the system characteristic. An improvement in the system characteristic can be identified for example in that at least one parameter which characterizes the system characteristic is detected at a point in time after the switchover to the pneumatic actuating device, and is compared with the corresponding parameter that was detected at a point in time before the switchover to the pneumatic actuating device. Such a parameter may for example be a pressure within a pneumatic line assigned to the brake, a deceleration of the vehicle, or a slip of a wheel assigned to the brake. If no improvement in the system characteristic is identified, then in a step 411, a switch is performed from the pneumatic actuating device back to the electronic actuating device. By contrast, if an improvement in the system characteristic is identified, then the pneumatic actuating device is at least temporarily maintained.

In one exemplary embodiment, after the switchover to the pneumatic actuating device, a switch is performed from the pneumatic actuating device back to the electronic actuating device in a time-controlled or event-controlled manner in a step 413. In a subsequent step 415, it is identified whether the switch from the pneumatic actuating device back to the electronic actuating device has led to an improvement in the outputting of the brake pressure. An improvement in the system characteristic can in turn be identified in that at least one parameter which characterizes the system characteristic is detected at a point in time after the switchover, which has occurred in step 413, to the electronic actuating device and is compared with the corresponding parameter that has been detected at a point in time before the switchover to the electronic actuating device. If, in step 415, it is identified that the switchover leads to an improvement, then the use of the electronic actuating device is maintained. Otherwise, a switch is performed again back to the pneumatic actuating device. In this case, it would be possible for the steps 413, 415 to be performed again at a later point in time, in order to check whether the use of the pneumatic actuating device is expedient again.

The described steps 405, 407, 409, 411, 413, 415 are optional, such that the steps 401, 403 of the method may be supplemented by one, several or all of the steps 405, 407, 409, 411, 413, 415.

Figure 5:
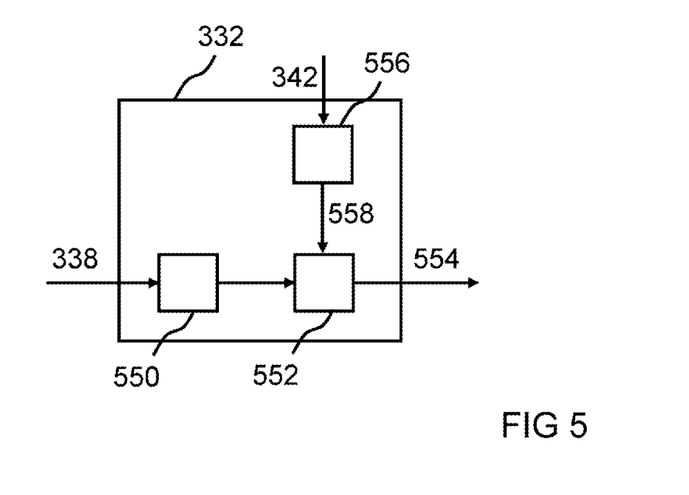
FIG. 5 shows a schematic illustration of an apparatus for operating a brake system for a vehicle as per an exemplary embodiment.

FIG. 5 shows a schematic illustration of an apparatus 332 for operating a brake system for a vehicle as per an exemplary embodiment. The apparatus 332 is, in one exemplary embodiment, configured to carry out all or some of the steps of the method described with reference to FIG. 4. To be able to carry out the step of classifying the fault signal 338, the apparatus 332 has a classifying device 550. To be able to carry out the steps of the switchover, the apparatus 332 has a switching device 552, which is for example configured to make available a switching signal 554 which are suitable for effecting a switchover between the electronic and the pneumatic actuating device. To identify whether an improvement in the system characteristic could be achieved by a switchover between the actuating devices, the apparatus 332 optionally has an identifying device 556, which is configured to identify an improvement in the system characteristic using an internal sensor or the state signal 342, and to make a signal 558, which is indicative of the improvement or possible worsening of the system characteristic, to the switching device 552.

Figure 6:
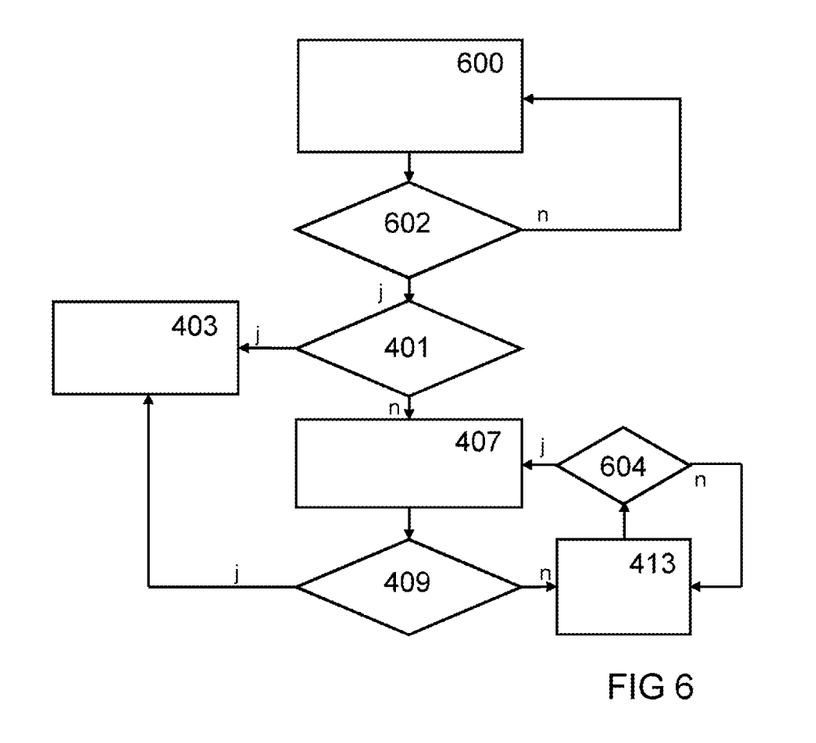
FIG. 6 shows a flow diagram of a method for operating a brake system for a vehicle as per an exemplary embodiment.

FIG. 6 shows a flow diagram of a method for operating a brake system for a vehicle as per an exemplary embodiment. The steps of the method may be carried out for example by an apparatus, described above, for operating a brake system.

The method begins in a state 600 electric regulation. This may be the normal operating state already described, in which the brake pressure is regulated or output using an electronic actuating device. In a step 602, it is checked whether a fault is identified. If this is not the case, then the state 600 of electric regulation is maintained. By contrast, if a fault is identified, then in a step of classifying 401, it is checked whether the fault identified in step 602 involves an electrical fault, which is mentioned here by way of example. If it involves an electrical fault which, taking into consideration the demand (driver/assistance system), exhibits the clearly better system characteristic in the backup, then in a step 403, a permanent switch is made to pneumatic backup regulation. For this purpose, a switch may be made to the backup operating mode already described, in which the brake pressure is output using a pneumatic actuating device. By contrast, if it does not involve an electrical fault, then temporary pneumatic pressure control is performed in a step 407. For example, a temporary switch is made to the backup operating mode. In a step 409, it is checked whether the characteristic has improved as a result of the temporary pneumatic pressure control initiated in step 407. If this is the case, then step 403 is executed, and a switch to permanent pneumatic backup regulation is performed. By contrast, if the characteristic has not improved, then in a step 413, temporary electric regulation is performed. In a step 604, it is checked whether a period of time has elapsed. If this is not the case, then the temporary electric regulation is maintained, and otherwise, a switch is performed back to the temporary pneumatic pressure control, by virtue of step 407 being performed again.

The backup situation is thus maintained after the temporary backup has yielded an improvement that has been identified in step 409. If the backup regulation proves to be poorer, and thus a switch back to electric regulation again is performed in step 413, then it is optionally possible, by temporary switching to backup again from time to time, to re-check whether the backup is then possibly more expedient. The step 604 can thus be regarded as being optional. However, if at any time it is found that the pneumatic backup regulation is the better regulation, then this is maintained in the normal case. It is however optionally also possible then—as a subordinate variant—to temporarily test the electric regulation again from time to time.

Figure 7:
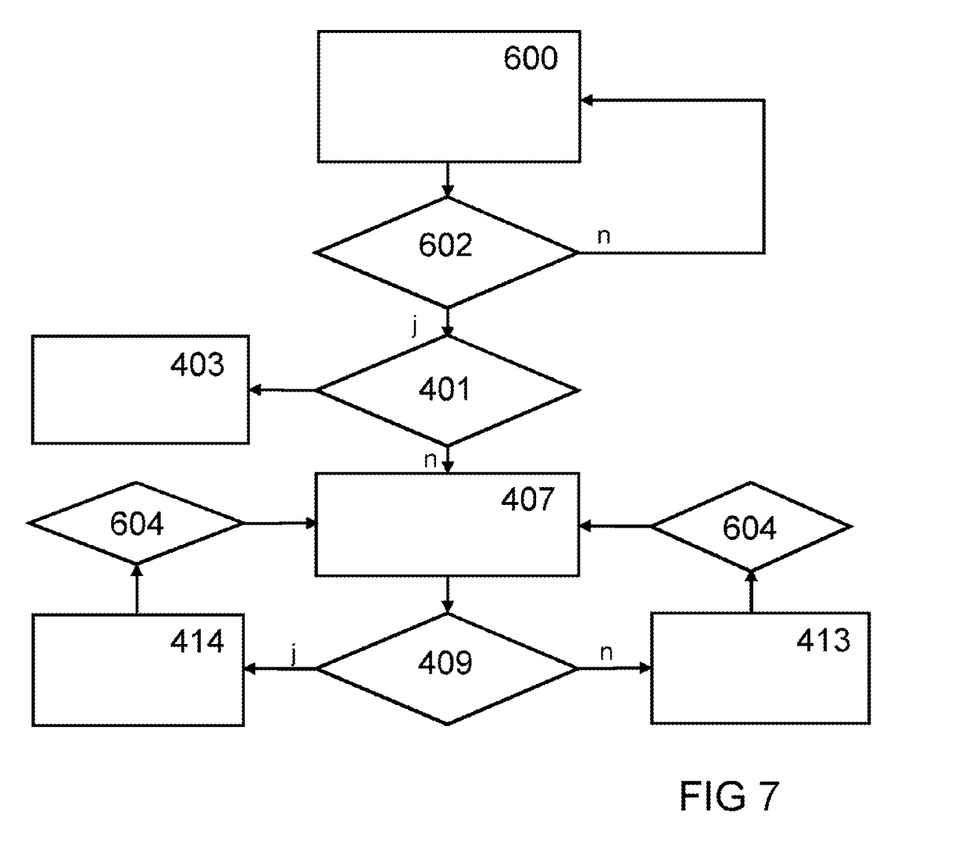
FIG. 7 shows a flow diagram of a method for operating a brake system for a vehicle as per a further exemplary embodiment.

FIG. 7 shows a flow diagram of a method for operating a brake system for a vehicle as per a further exemplary embodiment. The method corresponds to the method described on the basis of FIG. 6, but comprises additional steps 414, 604. As already stated, in the step 409, it is checked whether the characteristic is improved by the temporary pneumatic pressure control initiated in step 407. If this is not the case, then the method jumps to the step 413, and a temporary switch to electric regulation is performed. By contrast, if the characteristic has improved, then in a step 414, temporary pneumatic backup regulation is performed. Subsequently, in a step 604, it is checked whether a period of time has elapsed. After the period of time has elapsed, the method returns to the step 407, and a temporary switchover into the other operating mode is performed again.

Exemplary embodiments will be described in more detail below on the basis of the preceding figures.

After identification of a fault in the actuator 102, the actuator 102 is switched 403 into the backup mode only in the presence of faults in the case of which it is known that the system characteristic is improved in the backup situation. This can generally be clearly established for example in the presence of electrical faults (short circuit, line break). In the event of faults being identified in the case of which the cause of the fault cannot be clearly identified (for example implausible reaction of the pressure sensor values after solenoid valve activities), the actuator 102 is initially switched 407 "tentatively" into a mode in which the brake pressure 330 is determined by the backup pressure, but the sensor arrangement 344 continues to be operated in order to observe the system reaction. By a comparison 409 of the system characteristic in the two modes, it is decided whether the backup operation is maintained, or a switch back to electric regulation is performed.

If the electric regulation proves to be advantageous, this is continued. In particular, in the case of the electric provision of the brake pressure 330, further functions such as for example ABS, ESP, AEBS (emergency braking system) can be maintained.

As a criterion with regard to whether the electric regulation or the backup regulation is more expedient, it is for example possible to use the difference or the ratio of a desired brake pressure in relation to the actually attained brake pressure 330 in each of the two modes. The gradient of the pressure change in the desired direction after the switchover may also be used as a criterion. By the comparison of the pressure information during electric operation and during backup operation, it is decided which mode is the more expedient mode for the system characteristic.

As further criteria for this decision, it is possible to use the achieved deceleration or achieved slip of the corresponding wheel with the achieved differential slip of the corresponding wheel in relation to other wheels.

Since the system characteristic varies with changes in the ambient conditions, it is expedient for the test with regard to which operating mode yields the more expedient system characteristic to be periodically repeated. The criteria for the repetition may for example be a defined time, a pressure threshold of the output pressure, a pressure profile of the output pressure, a pressure threshold of the supply pressure, a pressure profile of the reservoir pressure.

As already stated, with the electric provision of the brake pressure, further functions such as for example ABS can be maintained. If, in the dedication of the fault, it cannot be reliably identified whether the electric or the pneumatic backup path constitutes the more expedient variant for the system characteristic, this may be determined by a comparison of the system characteristic in the two modes.

In the event of faults being identified in the case of which the cause of the fault cannot be clearly identified, the actuator 100 is switched into a mode in which the brake pressure is determined by the backup pressure, but the pressure information remains known to the system. By the comparison of the pressure information during electric operation and during backup operation, it is decided which mode is the more expedient mode for the system characteristic.

Since the system characteristic varies with the changes in ambient conditions, it is expedient for the test with regard to which operating mode yields the more expedient system characteristic to be periodically repeated. The criteria for the repetition may for example be a defined time, a pressure threshold of the output pressure, a pressure profile of the output pressure, a pressure threshold of the supply pressure, a pressure profile of the reservoir pressure.

For the assessment of the system characteristic, use may be made of a comparison of the desired pressure with the actually prevailing pressure, or the difference between the two modes.

A further criterion for the switchover into the other mode may be the achievable deceleration of the vehicle 300 or of the wheel 120. If the achievable deceleration falls below the legally required value, a switchover to the other mode is performed. If an improvement in the deceleration exists after the switchover, the mode is maintained, and otherwise, the mode is switched back again.

A further embodiment may be that the backup mode is maintained after a single test.

The deceleration may be derived from the achieved brake pressure 330 or by measurement of the vehicle deceleration by observing the wheel speeds or a sensor (acceleration, GPS, . . . ) 344.

The described exemplary embodiments have been chosen merely as examples, and may be combined with one another.

The list of reference designations is as follows:
100 Electropneumatic modulator (EPM)
102 Electronic actuating device
104 Pneumatic actuating device
106 Brake
108 Brake CAN bus
110 Control unit
112 Setpoint value sensor
114 Footbrake module
116 Pneumatic backup line
118 Reservoir
120 Wheel
300 Vehicle
330 Brake pressure 332 Apparatus for operating a brake system
334 Electric control system
336 Pneumatic control system
338 Fault signal
340 Fault monitoring device
342 State signal
344 Device for monitoring a system characteristic of the brake system
401 Step of classifying
403 Step of switching over
405 Step of maintaining
407 Step of at least temporarily switching over
409 Step of identifying
411 Step of switching back
413 Step of switching over (temporarily electric)
414 Step of switching over (temporarily backup)
415 Step of identifying
550 Classifying device
552 Switching device
554 Switching signal
556 Identifying device
558 Signal
600 State of the electric regulator
602 Step of checking
604 Step of checking

The invention claimed is:

1. A method for operating a brake system for a vehicle, the method comprising:
classifying a fault signal, which indicates a fault of an electronic actuating device of the brake system, as a fault signal of a first fault category if the fault is a fault in the case of which a switchover from the electronic actuating device afflicted with the fault to the pneumatic actuating device leads to an improvement in the outputting of the brake pressure, wherein the electronic actuating device is configured to output a brake pressure for a brake of the vehicle in a normal operating mode and a pneumatic actuating device for outputting the brake pressure in a backup operating mode; and
switching from the electronic actuating device to the pneumatic actuating device, so as to output the brake pressure using the pneumatic actuating device, if the fault signal is a fault signal of the first fault category, wherein, in the classifying, the fault signal is classified as a fault signal of a third fault category if the fault is a fault in which it is uncertain whether a switchover from the electronic actuating device afflicted with the fault to the pneumatic actuating device leads to an improvement in the outputting of the brake pressure; and
at least temporarily switching over from the electronic actuating device to the pneumatic actuating device to at least temporarily output the brake pressure using the pneumatic actuating device, if the fault signal is a fault signal of the third fault category.

2. The method of claim 1, further comprising:
identifying whether the switchover from the electronic actuating device afflicted with the fault to the pneumatic actuating device leads to an improvement in the outputting of the brake pressure or whether the at least temporary switchover from the electronic actuating device afflicted with the fault to the pneumatic actuating device leads to no improvement in the outputting of the brake pressure; and
switching back from the pneumatic actuating device to the electronic actuating device to output the brake pressure using the electronic actuating device, if, in the identifying, it has been identified that the at least temporary switchover from the electronic actuating device afflicted with the fault to the pneumatic actuating device leads to no improvement in the outputting of the brake pressure.

3. The method of claim 2, wherein, in the identifying, a first system characteristic during the outputting of the brake pressure using the electronic actuating device is compared with a second system characteristic during the outputting of the brake pressure using the pneumatic actuating device.

4. The method of claim 3, wherein the system characteristic is defined by a pressure within a pneumatic line assigned to the brake, and/or a deceleration of the vehicle and/or a slip of a wheel assigned to the brake and/or by the source of the actuation signal.

5. The method of claim 1, wherein the fault signal is classified as a fault signal of the first fault category if the fault can be attributed to an electrical cause in the electronic actuating device.

6. The method of claim 1, wherein, in the classifying, the fault signal is classified as a fault signal of the second fault category if the fault is a fault in which a switchover from the electronic actuating device afflicted with the fault to the pneumatic actuating device leads to no improvement in the outputting of the brake pressure, further comprising:
maintaining the use of the electronic actuating device to continue to output the brake pressure using the electronic actuating device, if the fault signal is a fault signal of the second fault category.

7. The method of claim 1, wherein, in the classifying, the fault is classified as a fault signal of the third fault category if the fault is a fault which is based on an implausible pressure profile in a pneumatic line assigned to the electronic actuating device.

8. A method for operating a brake system for a vehicle, the method comprising:
classifying a fault signal, which indicates a fault of an electronic actuating device of the brake system, as a fault signal of a first fault category if the fault is a fault in the case of which a switchover from the electronic actuating device afflicted with the fault to the pneumatic actuating device leads to an improvement in the outputting of the brake pressure, wherein the electronic actuating device is configured to output a brake pressure for a brake of the vehicle in a normal operating mode and a pneumatic actuating device for outputting the brake pressure in a backup operating mode;
switching from the electronic actuating device to the pneumatic actuating device, so as to output the brake pressure using the pneumatic actuating device, if the fault signal is a fault signal of the first fault category;
switching back from the pneumatic actuating device to the electronic actuating device to output the brake pressure using the electronic actuating device; and
identifying whether the switching back from the pneumatic actuating device to the electronic actuating device leads to an improvement in the outputting of the brake pressure.

9. A non-transitory computer readable medium having a computer program product, which is executable by a processor, comprising:
a program code arrangement having program code for operating a brake system for a vehicle, by performing the following:
classifying a fault signal, which indicates a fault of an electronic actuating device of the brake system, as a fault signal of a first fault category if the fault is a fault in the case of which a switchover from the electronic actuating device afflicted with the fault to the pneumatic actuating device leads to an improvement in the outputting of the brake pressure, wherein the electronic actuating device is configured to output a brake pressure for a brake of the vehicle in a normal operating mode and a pneumatic actuating device for outputting the brake pressure in a backup operating mode; and switching from the electronic actuating device to the pneumatic actuating device, to output the brake pressure using the pneumatic actuating device, if the fault signal is a fault signal of the first fault category.

10. An apparatus for operating a brake system for a vehicle, comprising:
a classifying apparatus to classify a fault signal, which indicates a fault of an electronic actuating device of the brake system, as a fault signal of a first fault category if the fault is a fault in the case of which a switchover from the electronic actuating device afflicted with the fault to the pneumatic actuating device leads to an improvement in the outputting of the brake pressure, wherein the electronic actuating device is configured to output a brake pressure for a brake of the vehicle in a normal operating mode and a pneumatic actuating device for outputting the brake pressure in a backup operating mode; and
a switching apparatus to switch from the electronic actuating device to the pneumatic actuating device, to output the brake pressure using the pneumatic actuating device, if the fault signal is a fault signal of the first fault category, wherein, in the classifying, the fault signal is classified as a fault signal of a third fault category if the fault is a fault in which it is uncertain whether a switchover from the electronic actuating device afflicted with the fault to the pneumatic actuating device leads to an improvement in the outputting of the brake pressure; and
at least temporarily switching over from the electronic actuating device to the pneumatic actuating device to at least temporarily output the brake pressure using the pneumatic actuating device, if the fault signal is a fault signal of the third fault category.

11. A brake system for a vehicle, comprising:
an electronic actuating device for outputting a brake pressure for a brake of the vehicle in a normal operating mode;
a pneumatic actuating device for outputting the brake pressure in a backup mode; and
an apparatus for operating a brake system for a vehicle, including:
a classifying apparatus to classify a fault signal, which indicates a fault of an electronic actuating device of the brake system, as a fault signal of a first fault category if the fault is a fault in the case of which a switchover from the electronic actuating device afflicted with the fault to the pneumatic actuating device leads to an improvement in the outputting of the brake pressure, wherein the electronic actuating device is configured to output a brake pressure for a brake of the vehicle in a normal operating mode and a pneumatic actuating device for outputting the brake pressure in a backup operating mode; and
a switching apparatus to switch from the electronic actuating device to the pneumatic actuating device, to output the brake pressure using the pneumatic actuating device, if the fault signal is a fault signal of the first fault category, wherein, in the classifying, the fault signal is classified as a fault signal of a third fault category if the fault is a fault in which it is uncertain whether a switchover from the electronic actuating device afflicted with the fault to the pneumatic actuating device leads to an improvement in the outputting of the brake pressure; and
at least temporarily switching over from the electronic actuating device to the pneumatic actuating device to at least temporarily output the brake pressure using the pneumatic actuating device, if the fault signal is a fault signal of the third fault category.

* * * * *